United States Patent [19]
Persico

[11] 3,905,638
[45] Sept. 16, 1975

[54] TOP AND SIDE DOOR VAN CONVERSION ASSEMBLY

[75] Inventor: George J. Persico, Warren, Ohio

[73] Assignee: Recreational Industries Inc., Warren, Ohio

[22] Filed: May 22, 1974

[21] Appl. No.: 472,301

[52] U.S. Cl............... 296/26; 296/23 R; 296/28 A
[51] Int. Cl.² .......................................... B62C 1/06
[58] Field of Search...... 296/23 R, 23 E, 28 A, 146, 296/26, 28 AB, 10

[56] References Cited
UNITED STATES PATENTS

| | | | |
|---|---|---|---|
| 1,612,839 | 1/1927 | Shields | 296/146 |
| 2,667,230 | 1/1954 | Duff et al. | 296/146 |
| 3,185,518 | 5/1965 | Zentner | 296/23 R |
| 3,731,970 | 5/1973 | Frank et al. | 296/23 R |
| 3,801,150 | 4/1974 | Decoster et al. | 296/23 R |

OTHER PUBLICATIONS
Kenex Coachwork Limited, Planning your Holidays, 2/5/60, p. 25.

Primary Examiner—Robert J. Spar
Assistant Examiner—Gary Auton
Attorney, Agent, or Firm—Webster B. Harpman

[57] ABSTRACT

A top and side door conversion assembly for a van so as to form a so called mini bus therefrom with full head room therein and convenient access thereto. A van under construction is modified by omitting the conventional top and a side wall and window panel and substituting therefor a top portion of increased height having a full height side wall bus door and an operator therefor. The door portion includes a lowered step portion which brings the bottom of the door below the bottom of the van floor. The top and side door assembly is secured to the van body as by welding to form a practical, water tight van conversion.

3 Claims, 3 Drawing Figures

TOP AND SIDE DOOR VAN CONVERSION ASSEMBLY

BACKGROUND OF THE INVENTION

1. Field of the Invention

This invention relates to vans which are also known as small panel trucks and means for converting such vans to small buses for passenger transportation.

2. Description of the Prior Art

No prior art is known wherein portions of a conventional van being assembled are omitted and modified van conversion portions subtituted so as to increase the head room in the van and provided a conventional bus door in a side wall thereof.

SUMMARY OF THE INVENTION

A top and side door van conversion assembly include a top section of increased height replacing the conventional top of the van and having a door frame suspended therefrom and carrying the operating assembly for folding doors pivoted therein as well as a step positioned at the bottom of the doors and below the van floor. The conversion assembly is installed at the time the van is initially assembled and becomes part of the van body in it's new form as a passenger carrying vehicle.

DESCRIPTION OF THE PREFERRED EMBODIMENT

Figure 1:
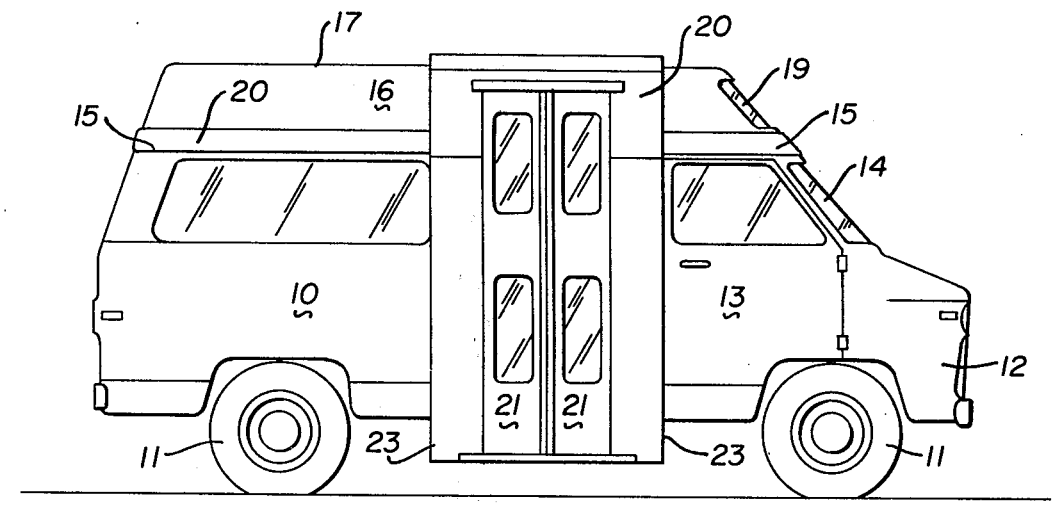
FIG. 1 is a side elevation of a van with the conversion assembly installed so as to form a small passenger carrying bus.
Figure 3:
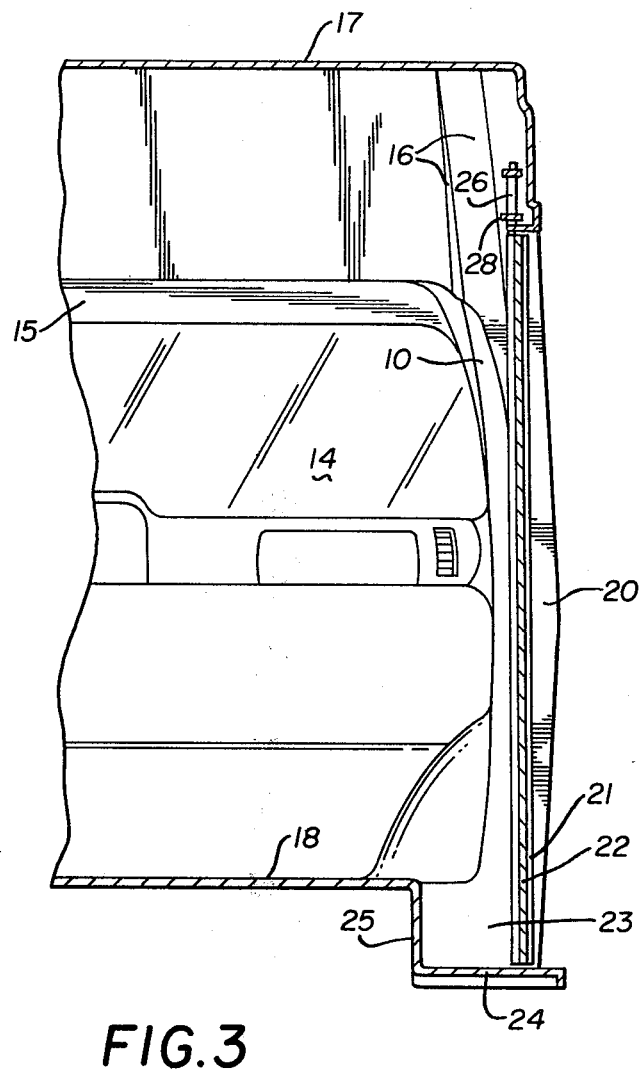
FIG. 3 is a vertical section on line 3—3 of FIG. 2.

As disclosed herein the top and side door van conversion assembly is illustrated in FIG. 1 of the drawings as applied to a conventional van, the body portion of which is indicated by the numeral 10 having ground engaging wheels 11 an engine compartment 12 and a conventional van access door 13. A windshield 14 is located at the forward end, the right end in FIG. 1, and the normal roof line of the van is indicated by the numeral 15. A top portion of increased height as compared with the usual top portion of a van is installed on the upper portion of the walls of the van body 10, side walls 16 supporting a generally horizontal top portion 17 which as may be seen by referring to FIG. 3 of the drawings is sufficiently elevated by the side walls 16 to enable passengers to stand upright in the van conversion and walk on the floor 18 thereof as between seats positioned therein. The forward end of the top portion of the van conversion assembly is preferably inclined and provided with a secondary windshield 19 and a molding 20 which can be integral with the van body 10 or the side wall 16 of the top portion of the van conversion assembly adds rigidity to the structure and enhances the installation of the top portion of the van conversion assembly to the conventional van body 10.

Figure 2:
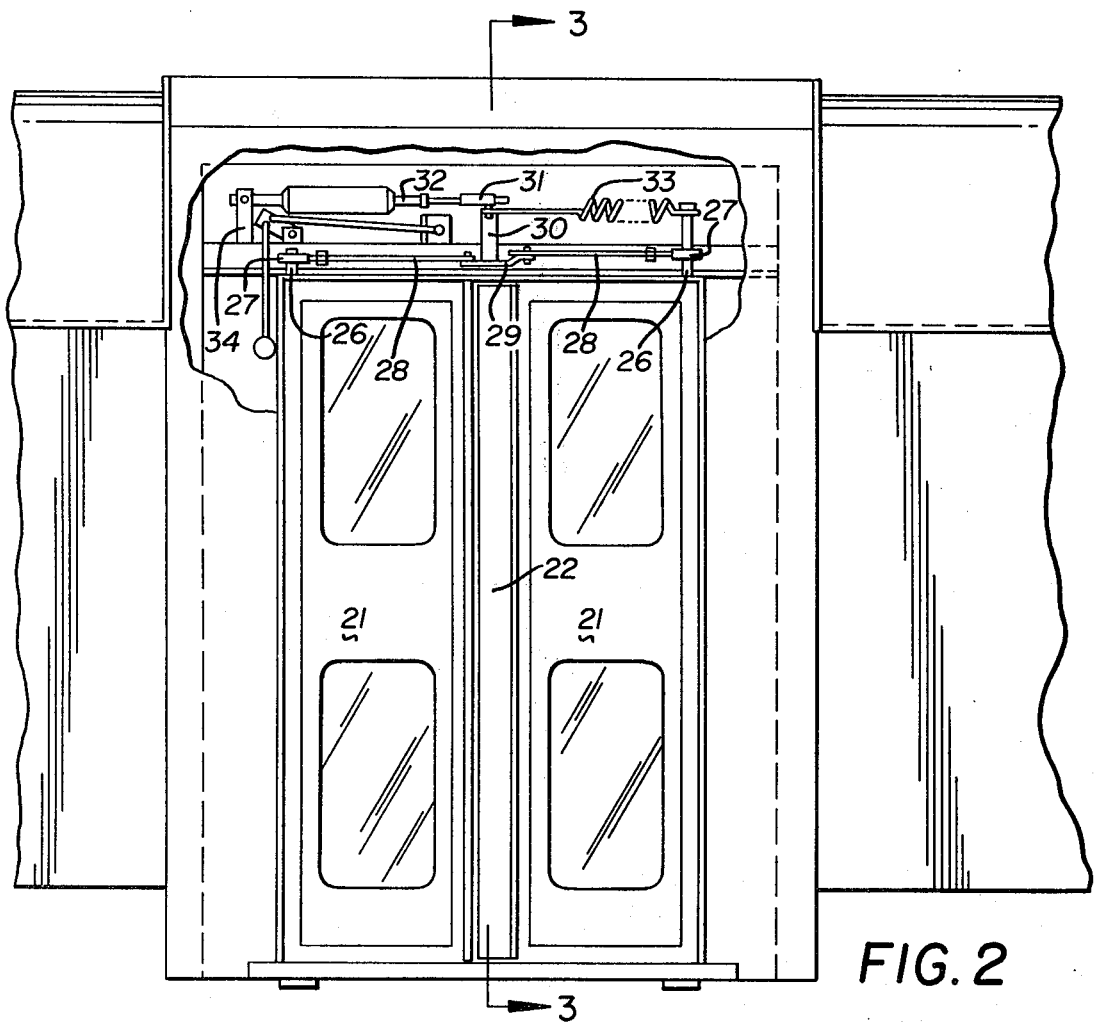
FIG. 2 is an enlarged detail with parts broken away and parts in cross section illustrating the operator means for the pivoted doors of the van conversion assembly.

Still referring to FIG. 1 of the drawings it will be seen that a portion of one of the side walls 16 of the top portion of the van conversion assembly has been moved outwardly to form a door frame 20 including a housing in the upper part thereof in which door operating means may be installed as seen in FIG. 2 of the drawings. A pair of pivoted doors 21 are pivoted in the door frame 20 at their upper and lower outermost corners and are provided with a weather sealing gasket 22 on their adjacent edges.

By referring to FIGS. 1 and 2 of the drawings it will be seen that the door frame 20 has front and side portions, the side portions being indicated by the numerals 23 and formed to extend between the curved side wall 10 of the van and the generally vertical front of the door frame 20. A step portion 24 and a riser 25 in connection therewith form a closure between the bottom side of the van body 10 and floor 18 thereof and the door frame 20 and provide a step for a passenger entering the converted van through the opened doors 21.

In order that the doors 21 may be opened and closed by remote control of the driver of the converted van, a conventional bus door operator is positioned in the upper portion of the door frame and immediately above the door 21 as best seen in FIG. 2 of the drawings and by referring thereto it will be seen that pivot members 26 by which the doors are mounted extend upwardly thereabove and are provided with offset cam plates forming cranks 27 to which a pair of oppositely disposed actuating arms 28 are pivotally attached. The inner opposite ends of the actuating arms 28 are pivotally attached to secondary cranks 29 on a rotatable shaft 30 which has a secondary cam plate 31 at it's upper end to which one end of a piston and cylinder assembly 32 is pivotally connected. A spring 33 is included in the assembly to normally bias the doors 21 to closed position. The other end of the piston and cylinder assembly 32 is pivoted to a support 34 and the door operator includes an air reservoir, a pressure regulating valve and a magenetic valve controlling communication of the air reservoir with the piston and cylinder assembly so that the device can be operated by a remotely positioned switch all as will be understood by those skilled in the art.

It will thus be seen that a van or panel truck may be converted, preferably at the time of manufacture thereof, to a small passenger carrying bus with full passenger height therein and a full pivoted conventional bus door assembly in the side wall thereof through the use of the top and side door van conversion assembly disclosed herein.

It will further be seen that the van conversion assembly improves the structure of the van body by extending the side walls vertically and supporting a new top portion transversely thereof in a manner so that the junction of the new top portion and the conventional van body forms a reinforced structure. The addition of the door frame extending into the new top portion and largely suspended therefrom further improves the rigidity and structural integration of the top and side door van conversion assembly and at the same time forms a desirable, lowered step making entry into the van conversion practical.

Although but one embodiment of the present invention has been illustrated and described, it will be apparent to those skilled in the art that various changes and modifications may be made therein without departing from the spirit of the invention.

Having thus described my invention what I claim is:

1. A top and side door conversion assembly for a van having a body with front, back and side walls with an open top and an opening in one of said side walls, said top and side door conversion assembly comprising a generally horizontal top portion with integral secondary front, back and side walls depending therefrom, said secondary front, back and side walls on said top portion arranged to register with and be secured to said front, back and side walls of said van body to close the open top thereof and increase the interior height of said van body, a door frame attached to and depending from said top portion and located in a secondary opening in one of the secondary side walls thereof and in registry with said opening in said side wall of said van body to form a doorway, movable doors in said door frame arranged to open and close the doorway, portions of said door frame engaged on and secured to said side wall of said van body at the sides of said opening therein so as to form with said doors a closure for said openings in said side wall of said body and secondary side wall of said top portion of said conversion assembly, said door frame having a horizontal lower portion forming a step and said door frame being on a substantially vertical plane with some of said door frame being offset outwardly of the adjacent side walls of said van body.

2. The assembly of claim 1 and wherein said horizontal step forming portion is below said van body.

3. The assembly of claim 1 and wherein a door operating device is positioned in said assembly above said doors and connected thereto for moving the same.

* * * * *